J. BLUM.
COMBINATION TOOL.
APPLICATION FILED FEB. 19, 1913.
1,068,731.
Patented July 29, 1913.
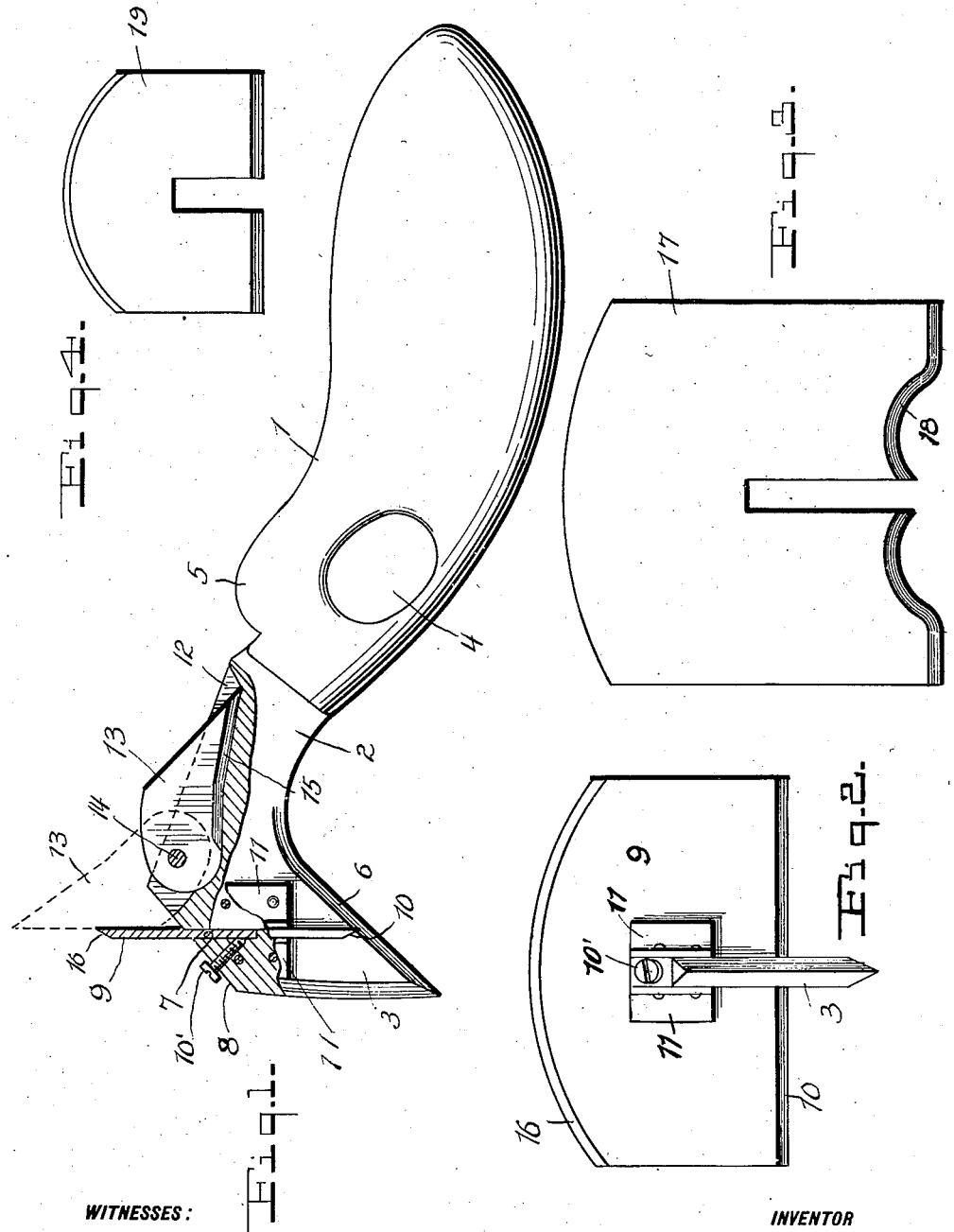
WITNESSES:
R. N. Jones
R. Smith
INVENTOR
Joseph Blum
BY
A. Randolph Jr.
ATTORNEY

UNITED STATES PATENT OFFICE.

JOSEPH BLUM, OF NEW YORK, N. Y.

COMBINATION-TOOL.

1,068,731. Specification of Letters Patent. Patented July 29, 1913.

Application filed February 19, 1913. Serial No. 749,459.

*To all whom it may concern:*

Be it known that I, JOSEPH BLUM, a citizen of the United States, residing at New York, in the county of New York and State of New York, have invented certain new and useful Improvements in Combination-Tools; and I do hereby declare the following to be a full, clear, and exact description of the invention, such as will enable others skilled in the art to which it appertains to make and use the same.

This invention comprehends improvements in combination tools especially adapted for use by plasterers and painters, and the primary object of the invention resides in the provision of a tool of this nature, which combines the properties of a cutter and scraper.

Another and more specific object of the invention resides in the provision of a combination tool comprising a plurality of cutters and a removable scraper blade.

In repairing cracked ceilings, walls, etc., it is customary to enlarge the crack by cutting away portions of the plaster in order that new plaster may be more readily applied. This cutting process causes particles of plaster or other similar material of which the wall or ceiling may be formed, to be broken from around the edges of the opening and left clinging thereto. It is then necessary to scrape the surface to remove these clinging particles before the opening can be filled with plastic material.

My invention aims to provide a device which will enlarge the crack and simultaneously scrape the surface so as to remove the clinging particles caused by the cutting process.

The invention also aims to provide a tool in which the scraper blade is removable and may be substituted by a blade shaped to conform to the surface to be plastered.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation, partly broken away and partly in section, of a tool constructed in accordance with my invention, Fig. 2 is a front elevation thereof, Fig. 3 is a view of a scraper blade, such as is used when moldings are being plastered, and, Fig. 4 is a view of another form of scraper blade.

Referring in detail to the drawings by numerals, 1 designates the handle of my combined tool, 2 the shank which extends from one end of the handle, and 3 a cutter, which is formed upon the end of the shank. The handle 1 is curved to conform to the hand and is provided with a finger opening 4 and a thumb rest 5. The cutter extends at an angle to the shank, tapers to a point, and is sharpened along its inner edge, as indicated at 6. The cutter is formed with a slot 7 which extends essentially parallel to the outer end of the cutter and which opens upon the inclined edge 8. A cutting blade 9 is adapted to fit within said slot and is itself slotted, so as to permit the lower beveled edge 10 to extend within a short distance of the cutting edge 6. A locking screw 10' is threaded through a portion of the cutter 3 into engagement with the blade 9 so as to retain the latter in position. Angular brace plates 11 are rigidly secured to the cutter and extend laterally therefrom upon opposite sides of the blade 9, thereby bracing the same.

The shank 2 is formed with a recess 12 in its upper edge and a cutting blade 13 pivotally secured within said recess by means of a suitable fastener 14. The cutting blade 13 tapers to a point at its free end and is sharpened along one edge, as indicated at 15. This cutting blade is adapted to be partly received within the recess 12 and may be swung so as to engage the cutter 9 and project beyond the beveled edge 16 thereof.

To enlarge a crack or opening in a flat plastic surface preparatory to being filled with fresh material, the cutter 3 is drawn along the edge of said crack or opening and the beveled edge 10 engages the unbroken surface and removes therefrom any particles of material which may be partly broken from around the crack or opening by the cutter. Should the surface which is to be plastered be concave the cutting blade 13 is swung into operative position and used to enlarge the opening. The curved edge 16 of the scraper blade coöperates with the cutting blade 13 and removes the pieces of plastic material which would otherwise be left clinging around the opening.

In Fig. 3 I have shown a cutting blade 17 which is to be substituted for the blade 9 when a plastic molding is to be repaired. The curved edge 18 of the scraper blade is shaped so as to conform to the surface of the molding. 19 is a scraper blade similar in shape to the blade 9 but of somewhat smaller dimensions. When it is desired to smooth a plastic surface, the cutting blade 13 is swung into the recess 12 and the corresponding edge of the scraper blade used.

From the foregoing description taken in connection with the accompanying drawings, it will be seen that I have provided a combination tool which greatly facilitates the work of repairing plastic surfaces, which is of simple construction, and which is adapted to receive differently shaped scraper blades.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

1. A tool of the character described, comprising a handle member, a cutting blade rigid with one end thereof, and a scraping blade extending on opposite sides of the cutting blade in a plane at right angles thereto.

2. A device of the character described, comprising a handle, a cutting blade secured to one end thereof and having converging edges, a scraping blade projecting upon opposite sides of the cutting blade in a plane at right angles thereto, and means for removably securing the scraping blade to the cutting blade.

3. A tool of the character described, comprising a handle, a cutting blade secured to one end thereof, the inner and outer edges of the cutting blade converging to a point, an open ended slot formed in the cutting blade and extending toward the inner cutting edge, a scraping blade fitted within said slot and extending upon opposite sides of the cutting blade, and means to removably secure the scraping blade in the slot of the cutting blade.

4. A tool of the character described, including a handle, a shank, a scraping blade secured transversely of the shank, and a cutter pivoted to the shank for engagement with the inner face of the scraping blade, said cutter engaging the central portion of the blade and projecting beyond the scraping edge thereof.

In testimony whereof I affix my signature in presence of two witnesses.

JOSEPH BLUM.

Witnesses:
 ROBT. F. KIRCHOFER,
 CARL GALM.